United States Patent

[11] 3,613,703

| [72] | Inventor | William H. Stout |
| | | 223 N. Jessup St., Portland, Oreg. 97217 |
| [21] | Appl. No. | 886,816 |
| [22] | Filed | Dec. 22, 1969 |
| [45] | Patented | Oct. 19, 1971 |

[54] MOVING IRRIGATION SYSTEM
5 Claims, 10 Drawing Figs.

[52] U.S. Cl. .................................................... 137/1,
137/344, 239/212
[51] Int. Cl. ...................................................... E03b 1/00,
F17d 1/00
[50] Field of Search .......................................... 239/212;
137/344, 1

[56] References Cited
UNITED STATES PATENTS

| 2,800,364 | 7/1957 | Dick et al. ................... | 239/212 X |
| 2,940,672 | 6/1960 | Gaskell ....................... | 239/212 |
| 3,245,595 | 4/1966 | Purtell ........................ | 239/212 |
| 3,268,174 | 8/1966 | Boone ......................... | 239/212 |
| 3,302,883 | 2/1967 | Stout .......................... | 239/212 |
| 3,355,109 | 11/1967 | Kane .......................... | 137/344 X |
| 3,417,766 | 12/1968 | Purtell ........................ | 239/212 X |
| 3,498,542 | 3/1970 | Hefner et al. ................ | 239/212 |
| 3,503,556 | 3/1970 | Moulton ...................... | 239/212 |

Primary Examiner—Samuel Scott
Attorney—L. R. Geisler

ABSTRACT: A composite, mobile, laterally moving sprinkling pipeline so arranged and controlled that each end of the composite line alternately can be caused to travel a predetermined distance along an arcuate path with the opposite end of the composite line temporarily being substantially at the center of curvature of such arcuate path and with the entire line thus swinging forwardly in alternate angular direction, the composite pipeline being flexible and comprising connected sections with each section automatically moving to maintain alignment with an adjacent section during line travel.

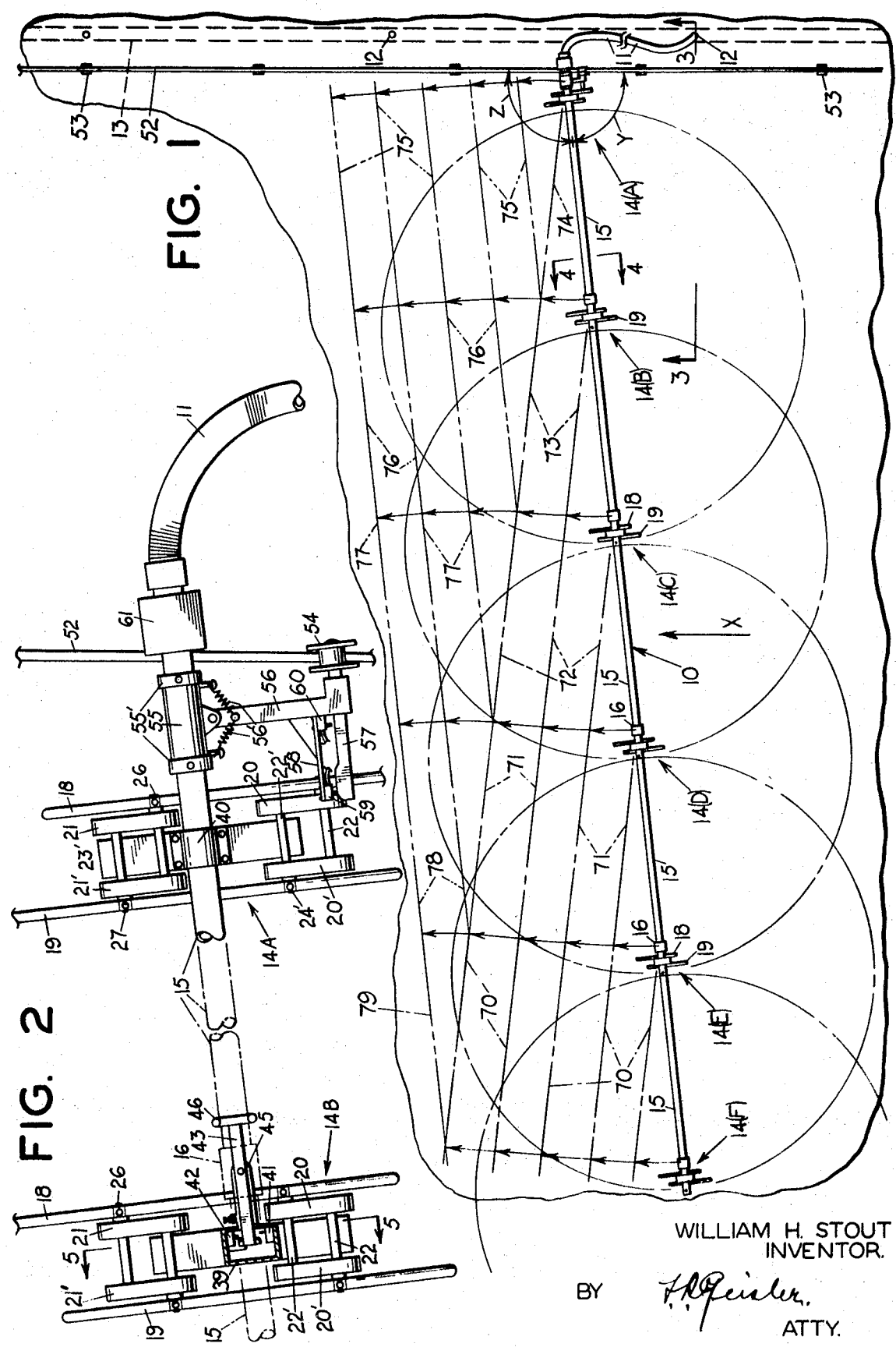

WILLIAM H. STOUT
INVENTOR.

BY F.R. Geisler
ATTY.

PATENTED OCT 19 1971 3,613,703
SHEET 3 OF 4
FIG. 5
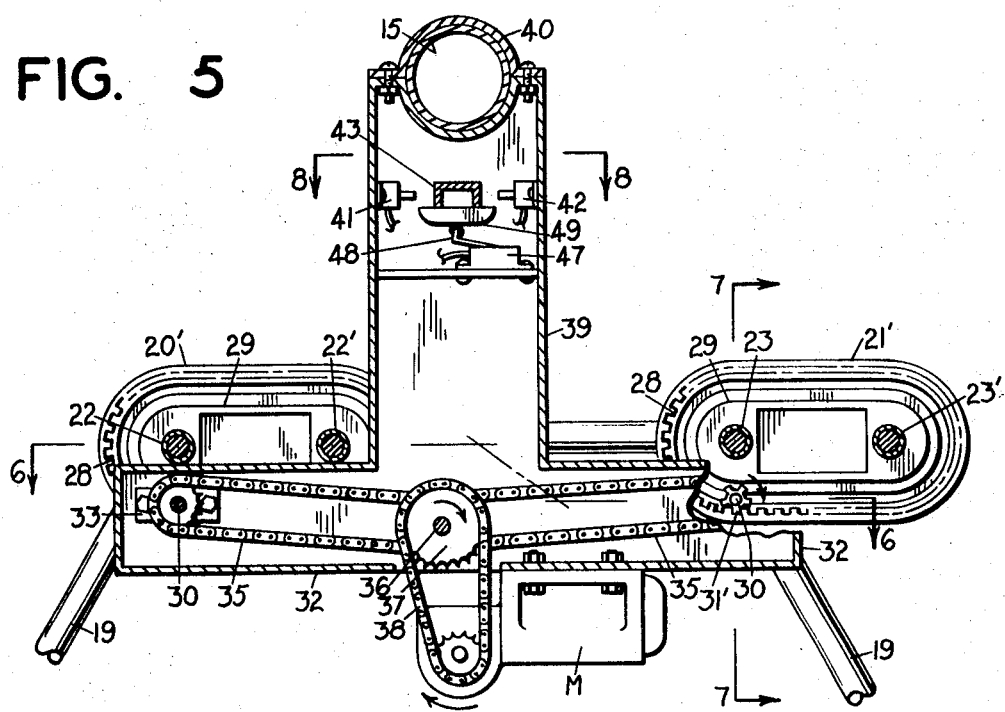
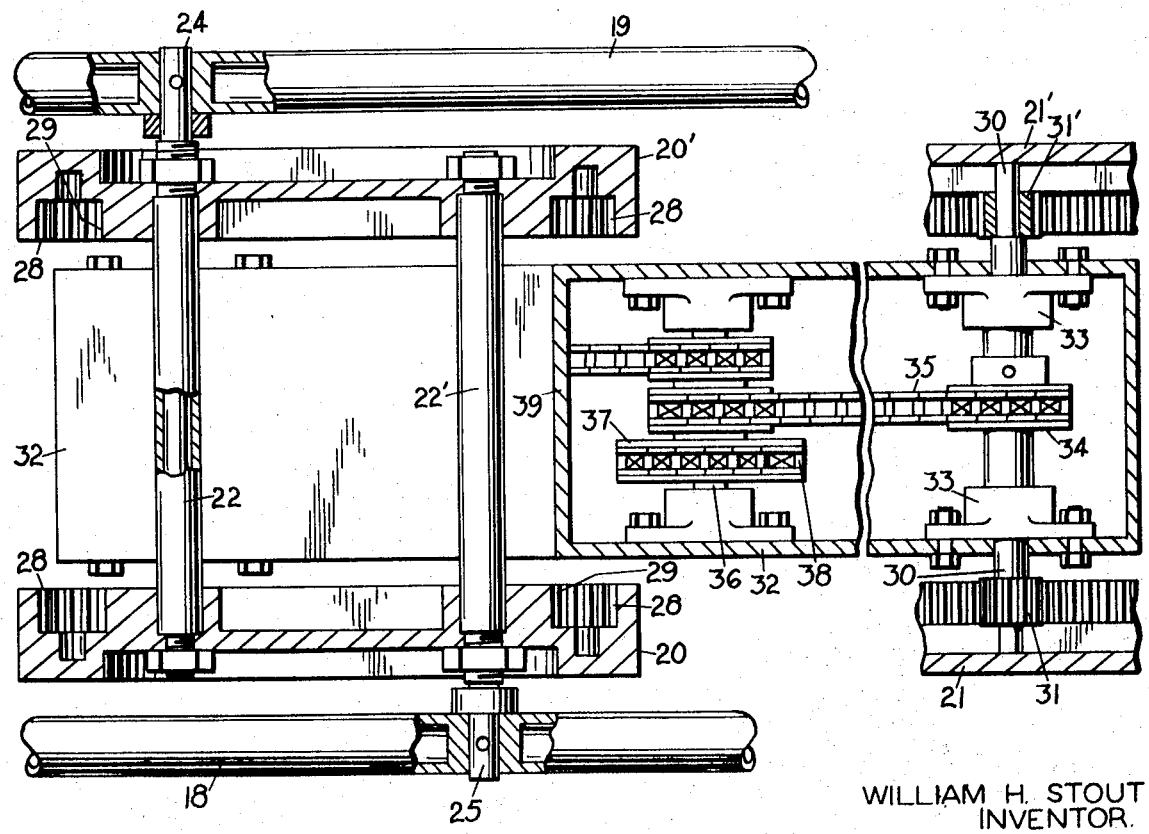
FIG. 6
WILLIAM H. STOUT
INVENTOR.
BY *F. N. Geisler*
ATTY.

WILLIAM H. STOUT
INVENTOR.

MOVING IRRIGATION SYSTEM

BACKGROUND OF THE INVENTION

Irrigation systems which move while providing continuous sprinkling of the ground over which they move, and, more particularly, such mobile or traveling sprinkling pipelines which move laterally over the ground during the sprinkling operation, are known in the art. Such a system is described in U.S. Pat. No. 3,302,833, issued Feb. 7, 1967, in which the pipeline on which the sprinklers are mounted is moved laterally through the operation in unison of a series of ambulatory mechanisms which support the line or conduit at spaced distances along the line, the ambulatory mechanisms being operated by a rotating shaft extending longitudinally along the line parallel to the water conduit for the sprinklers.

Another patent teaching somewhat similarly the same basic idea is described in U.S. Pat. No. Re. 26,285, reissued under date of Oct. 17, 1967, and entitled "Traveling-While-Sprinkling Irrigation Apparatus And System." In the apparatus and system described in this patent the line or conduit for the sprinklers is mounted at spaced intervals on wheeled means driven through the intermediary of water motors actuated from a separate water pressure line.

Both of these systems are designed to produce uniform travel of a mobile sprinkler pipeline in a direction substantially perpendicular to the direction in which the main water supply pipeline extends; and apparently, on flat, evenly surfaced ground, the systems described in these patents are capable of accomplishing this object more or less satisfactorily. However, when such lateral travel of the mobile sprinkler line must take place over rolling terrain, and particularly when the mobile sprinkler line moves laterally across the side slope of a hill, the natural tendency of the entire mobile sprinkler assembly will be to deviate somewhat from its course, as for example, to slide gradually downgrade on the hillside during its lateral travel. An important object of the present invention is to hold the traveling sprinkler line more accurately to its desired course regardless of the contour of the ground to be covered. Another object is to enable the direction of travel of the mobile assembly to be arbitrarily modified when desired.

OUTLINE OF THE INVENTION

With the present invention the sprinkler pipeline comprises a mobile composite pipeline including a plurality of sprinkler pipe sections connected together in series by flexible connections and/or sections of flexible pipe connected together. The mobile composite pipeline is supported on a series of traveling supports located at intervals along the composite pipeline, and these traveling supports are separately and automatically controlled in such manner that during any traveling movement of the composite pipeline each section of the pipeline will automatically be moved into alignment with an adjacent pipe section. Instead of all parts or sections of the pipeline moving laterally in unison, as in the case of the systems described in U.S. Pat. Nos. 3,302,883 and Re. 26,285, previously mentioned, in the present invention the lateral movement of the composite pipeline is made up of a series of separate movements of each traveling support. Thus movement of the line is initiated by movement of the traveling support at one end, and as soon as this moves into slight predetermined angularity with respect to the next adjacent traveling support, automatically actuated means causes the second traveling support to start moving to keep in alignment with the first traveling support. Similarly, the second traveling support causes the third traveling support then to move automatically to maintain its alignment with the second traveling support, and so on. As a result, the first section proceeds to move laterally in a slightly arcuate course during which time the opposite, or momentarily inner end of the composite pipeline temporarily is substantially at the center of curvature of the arcuate course along which the other or temporarily outer end of the line continues in its forward movement, while the momentarily inner end of the line either remains stationary or travels very little by comparison. Then when the entire line has moved into a position of predetermined angularity with respect to the direction in which the main supply line extends, the sequence of movement of the traveling supports of the mobile pipeline is reversed, the inner end traveling support of the line then initiating the series of movements in succession of the traveling supports and continuing to travel forwardly similarly in a slightly arcuate course while the outer end of the mobile line now in turn either does not move or moves comparatively little. In this way, instead of moving laterally in the constantly uniform manner, the entire mobile line while moving turns very slightly first toward one side and then toward the other side of the course, but always with one end of the line either not moving at all and thus serving temporarily as a fixed anchorage or center of curvature of the arc of the moving end, or moving very little by comparison. As a result, any permanent appreciable deviation toward one side or the other of the desired path of lateral travel of the composite line is avoided since each end of the line alternately goes forward. Furthermore, by arbitrarily and manually changing the control means for the angular travel of the entire line, the mobile line can be caused to vary its area of sprinkler coverage.

BRIEF DESCRIPTION OF THE DRAWINGS OF THE PREFERRED EMBODIMENT

In the drawings:

FIG. 1 is a plan view of the traveling sprinkling line with its connections and operating parts, and a diagrammatic plan illustrating the basic principle of the invention in which each end of the traveling sprinkling line alternately serves as the leading end in the forward travel pattern;

FIG. 2 is a fragmentary plan view of the right-hand end portion of the sprinkling line as viewed in FIG. 1, drawn to an enlarged scale this plan also being taken on line 2—2 of FIG. 3;

FIG. 5 is a fragmentary sectional elevation taken on line 5—5 of FIG. 2, drawn to a larger scale, showing more clearly the main portion of the operating mechanism in one of the ambulatory standards and also part of the switch control for the same;

FIG. 6 is a fragmentary and foreshortened section on line 6—6 of FIG. 5, drawn to a still larger scale;

Figure 9:
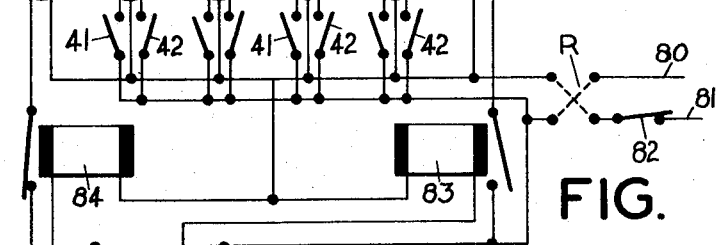
Figure 4:
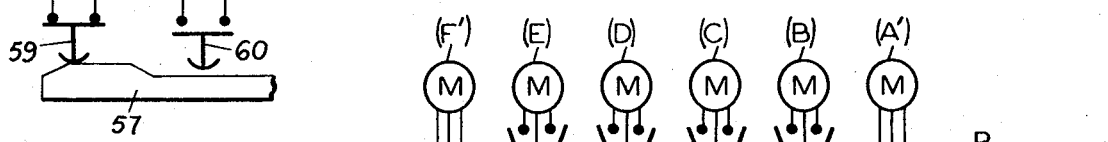
FIG. 4 is a sectional elevation on line 4—4 of FIG. 1, drawn to the same scale as FIG. 2 and 3, showing, in side elevation, one of the ambulatory standards or walking mechanisms constituting a preferred means for movingly supporting each section of the sprinkling line.
Figure 10:
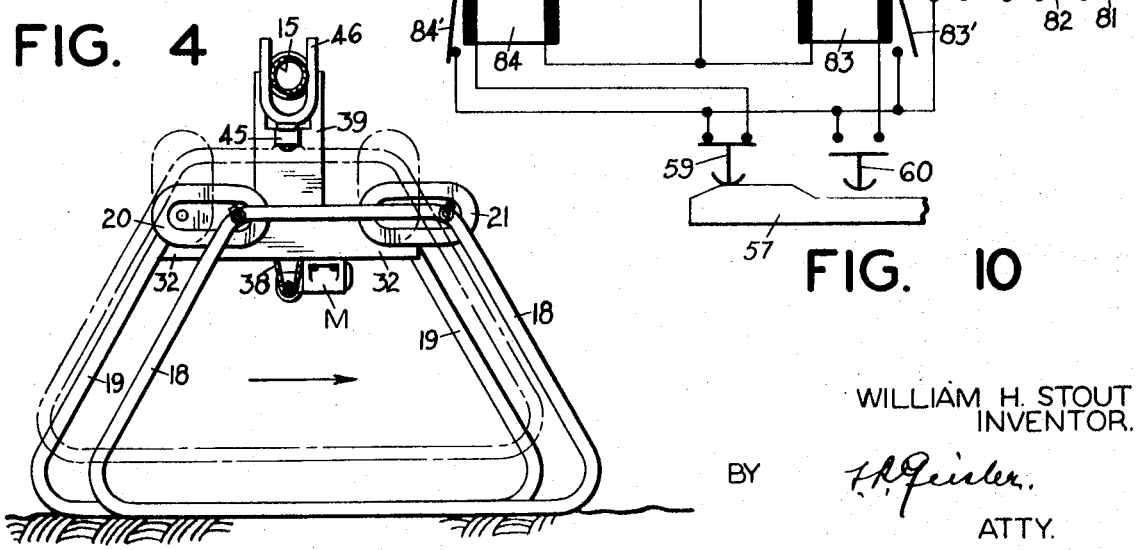

FIG. 9 is a simplified wiring diagram showing the manner in which the travel movement of the sprinkling line is automatically controlled when each end of the sprinkling line alternately remains stationary temporarily while the other end moves forwardly; and FIG. 10 is a corresponding wiring diagram of a slightly modified control arrangement by which one end of the sprinkling line travels forwardly very slowly, instead of momentarily remaining stationary, while the other end moves forwardly at greater speeds, the motors for the walking mechanisms at each end of the line being two-speed reversible motors instead of single-speed motors.

Referring first to FIG. 1, the mobile sprinkling pipeline, indicated as a whole by the reference 10, is connected at one end, through the medium of a flexible suitable hose 11, to one of a series of outlets 12 provided at spaced distances along a main supply line located in the ground and indicated by the broken lines 13, the outlets 12 extending upwardly from the ground surface. For the purpose of description it is assumed that if it is desired to have the sprinkling line move in the direction indicated by the arrow X in FIG. 1 over the area located to the left of the main supply line 13, as viewed in FIG. 1. The flexible hose connection 11 is long enough to cover amply the distance between the successive outlets 12 on the supply line 13, and, as the sprinkling pipeline moves ahead, the hose 11 is connected successively to the series of outlets 12 as required and as is customary.

The water conduit for the sprinklers on the sprinkling pipeline 10 extends along at a desired distance above the ground, supported at spaced intervals on traveling supports indicated in general by the reference 14 and located at equal distances along the sprinkling line. For convenience in the subsequent description the traveling supports, in succession beginning with the one nearest to the main supply line, are also designated A, B, C, D, E and F. Sprinkler heads (not shown) are mounted at intervals along the sprinkling pipeline. Such arrangement in general is well known in the art.

Figure 3:
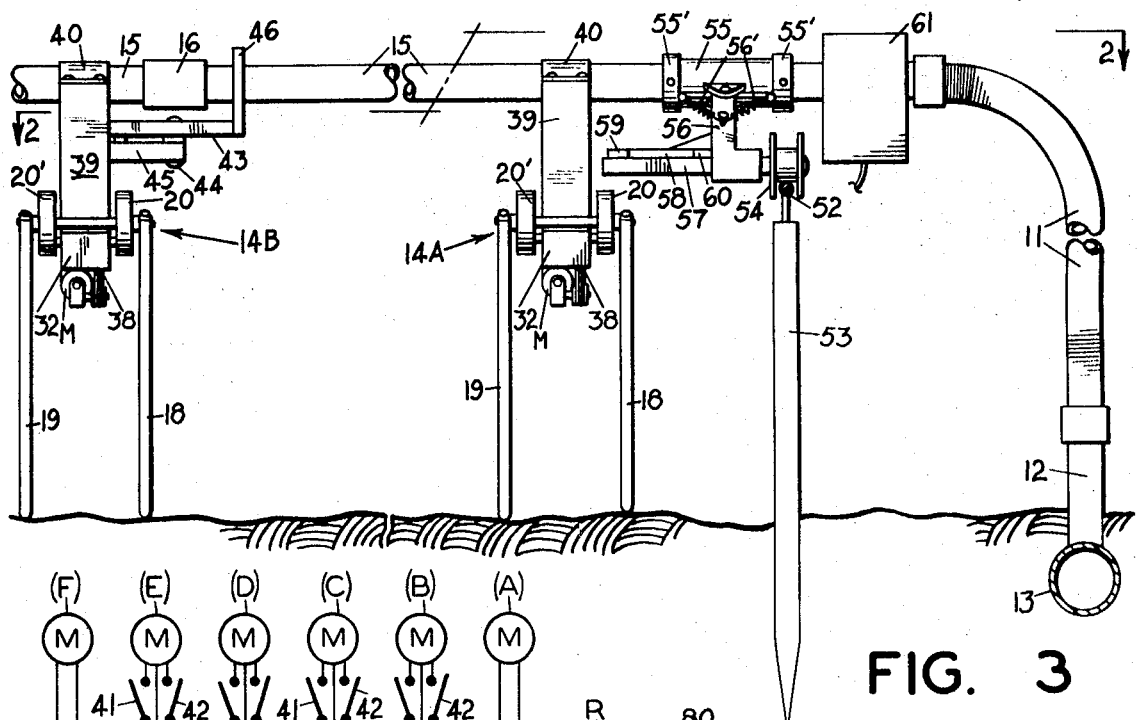
FIG. 3 is a side elevation taken on line 3—3 of FIG. 1, thus corresponding to the plan view of FIG. 2, and drawn to the same scale as FIG. 2.

In the carrying out of the present invention the water conduit in the sprinkling pipeline 10 is flexible as well as mobile and may comprise sections of equal length of flexible pipe of suitable material, such as plastic or rubber, provided with metal connecting members at the locations of the traveling supports and sprinkler heads, or the pipeline may comprise rigid pipe sections with flexible connecting sleeves. In the present description the sprinkling pipeline 10 is illustrated and described as composed of a series of rigid pipe sections 15 connected together by flexible sleeves 16 (see also FIGS. 2 and 3), this being considered a preferred arrangement.

Each of the pipe sections 15 is mounted on one of the traveling supports 14 which is located near one end of the pipe section adjacent the flexible sleeve 16 connecting that end of the pipe section to the adjoining pipe section. With the present invention these traveling supports may consist of standards mounted on wheels, somewhat like those described in U.S. Pat. No. Re. 26,285, previously mentioned, except for the fact that the wheels would be operated and controlled electrically, or the traveling supports may consist of ambulatory mechanisms similar to those of the previously mentioned U.S. Pat. No. 3,302,883, with certain modifications and also with electrical operating and control means. Since traveling supports of the latter type are considered preferable in the carrying out of the present invention, they are shown in the drawings and will now be briefly described with reference to FIGS. 2 to 7 inclusive.

Each of the traveling supports or ambulatory mechanisms 14 includes a pair of identical open support frames 18 and 19, preferably in the shape of an isosceles trapezoid, spaced apart in parallel normally vertical planes. Spacer cranks (not shown) but as described in U.S. Pat. No. 3,302,833, (to which reference is to be made for fuller description) connect the two frames and guide them in their ambulatory movement, insuring that the frames ambulate in their separate parallel planes and have lateral stability. A pair of identical crank mechanisms (similar to the single mechanism for each ambulatory mechanism in U.S. Pat. No. 3,302,883) are mounted between the tops of the supporting frames 18 and 19. Each of these crank mechanisms comprises a pair of spaced-apart crank arms 20, 20' and 21, 21'. The pair of crank arms in each crank mechanism are firmly connected together in spaced-apart relationship, so as to operate in unison, by a pair of crossbars 22, 22' and 23, 23' respectively. The crossbars 22, 22' of one crank mechanism each carry an oppositely extending crankpin, the crossbar 22 having an extending crankpin 24 (FIG. 6) which is journaled in the top of the frame 19, and the crossbar 22' having an oppositely extending crankpin 25 which is journaled in the top of the frame 18. Similarly the crossbars 23, 23' in the other crank mechanism have oppositely extending crankpins 26 and 27 respectively (FIG. 7) journaled in the top of the frames 18 and 19 respectively.

Each of the opposed faces in the crank arms 20, 20' of one of the crank mechanisms, and each of the opposed faces in the crank arms 21, 21' of the other identical crank mechanism, is provided with a continuous oblong or elliptical gear rack 28, preferably having its teeth directed inward. The shape of the rack 28 is that of a symmetrical oval. The curved ends are circular and concentric with the crossbars 22, 22' or 23, 23' as the case may be, and the flat sides are parallel and tangential with the curved end portions. A groove 29 is also provided in each crank arm contiguous with the gear rack and following the same shape or pattern.

A counter shaft 30 (FIGS. 6 and 7) extends between each pair of crank arms 20, 20' and 21, 21' having its ends disposed in the grooves 29 of the pair of crank arms and this countershaft has a pair of pinion gears 31, 31' secured on its opposite ends which mesh with the gear racks 28 in the pair of crank arms respectively. A housing 32 (FIGS. 5, 6 and 7) is carried on the two countershafts 30, mounted in between the pairs of cranks arms 20, 20' and 21, 21', the opposite sidewalls of the housing 32 having suitable bearings 33 (FIGS. 6 and 7) through which the countershafts extend.

An intermediate gear 34, secured on each counter shaft 30, is connected by a sprocket chain 35 to a gear on a central shaft 36, which central shaft is mounted in the housing 32. A drive gear 37 (FIGS. 5 and 6) secured on the central shaft 36, is connected by a sprocket chain 38 with the reduction gear assembly operated by a motor M. The housing for the motor M is secured to and supported by the housing 32, as shown best in FIG. 5. The housing 32 has a central upwardly extending portion 39 (FIGS. 3, 4 and 5), the upper end of which is provided with a clamping support 40 for a pipe section 15 of the water conduit for the sprinkling line 10.

Referring again to FIG. 1, it is assumed for the purpose of this description that the sprinkling line 10 consists of five pipe sections 15 connected by flexible sleeves. The sprinkling line is movably carried on six traveling support means 14, one at each end of the line and four positioned adjacent the flexible connecting sleeves along the line. Each of the traveling support means is separately and independently operated by means of a motor M carried by the support means. For clarity, the six traveling support means 14 in FIG. 1 are also separately indicated by the letters A, B, C, D, E and F, the traveling support means A and E being located at the opposite ends of the line, and the traveling support A being located at the end of the sprinkling line nearest to the main supply pipeline 13, the master control for the travel of the pipeline also being located at this end, as later mentioned.

Figure 8:
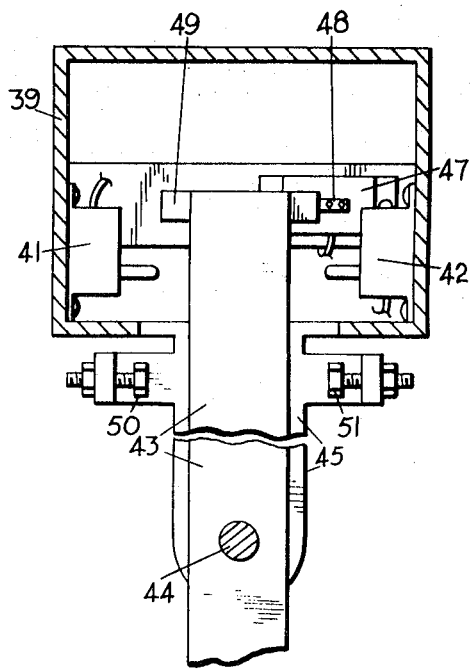
FIG. 8 is a combination section and fragmentary plan taken on line 8—8 of FIG. 5, drawn to an enlarged scale.
Figure 7:
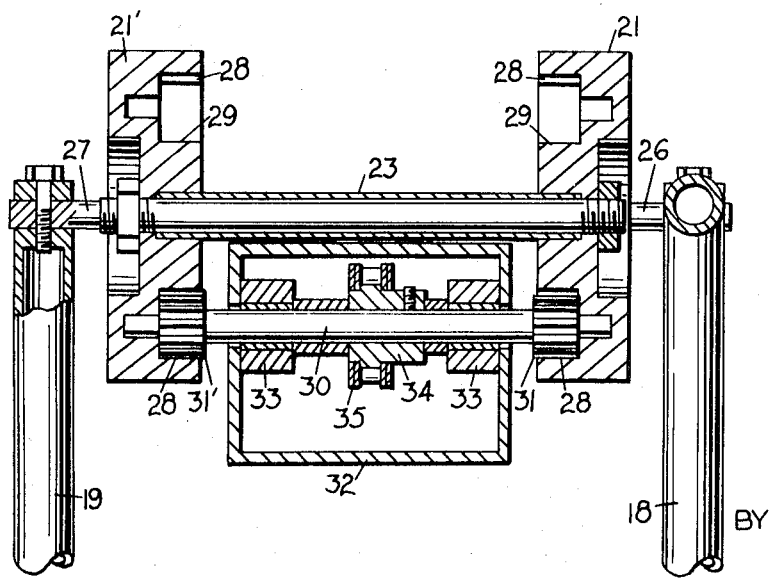
FIG. 7 is a fragmentary section on line 7—7 of FIG. 5, drawn to the same scale as FIG. 6.

Each of the central upward extending portions 39 on the housings 32 (FIG. 5) of the traveling support means is provided with a pair of switches 41 and 42 (FIGS. 5 and 8) on its opposite lateral walls, below the support clamp for the pipe section, which switches are connected to the motor of the traveling support. An end of a pivotally mounted arm 43 is located in between the switches and the swinging of the arm causes one switch or the other to be closed when engaged by the arm. As shown best in FIG. 8, but also in FIGS. 2 and 3, the arm 43 extends in through an opening in the end sidewall of the housing extension 39 and is pivotally supported centrally on a stub shaft 44 secured on an extending bracket 45 secured on the wall of the housing extension 39. The outer end of the arm 43 carries a U-shaped clamp 46 (FIGS. 2, 3 and 4) which engages the adjacent pipe section, the pivotal point of the arm 43 being located beneath the flexible sleeve 16 connecting the two adjoining pipe sections, as shown best in FIG. 3. This arrangement of the pivotal operating switch controls for the motors of the traveling support means, however, is omitted with the end-travelling support means 14 (A) and 14 (F) (FIG. 1), as later explained. From FIGS. 2 and 3 it will now be apparent that when one pipe section 15 moves sufficiently laterally out of alignment with the adjacent pipe section the arm 43 will engage a switch in the housing extension of the traveling support, and, by closing a circuit to the motor of the traveling support, cause the traveling support to move until the bringing of the two pipe sections in alignment will cause the arm 43 to disengaged from the contacted switch, thus temporarily stopping the operation of the motor and the movement of the traveling support.

An interrupter safety switch 47 (FIGS. 5 and 8) has a spring finger 48 which is held down by engagement with a member 49 on the bottom of the inner end of the arm 43. Should the inner end of the arm 43 swing excessively to one side or the other the resulting upward movement of the finger 48 would cause the safety switch 47 to open and interrupt the current to the motor. A pair of adjustable limit stops 50, 51 (FIG. 8) are mounted on arms extending from opposite sides of the brackets 45 to prevent any possibility of the arm 43 swinging to such extent as to damage either of the switches 41 or 42.

A guide means is provided for the end of the sprinkling line nearest the supply pipeline 15 and extends along parallel to the supply pipeline. While this guide means may be constructed in various ways, a preferred simple form, shown in FIGS. 1, 2, and 3, includes a rail 52 extending along above the ground, parallel to the supply pipeline 13, and mounted at intervals on support stakes 53 driven into the ground, providing a track for a double flanged wheel 54.

A sleeve 55 (FIGS. 2 and 3), rotatably mounted on the first section of pipe in the sprinkling line near the attachment for the flexible hose connection 11, and held against movement in an axial direction by a pair of collars 55' at each end, pivotally supports arm 56. A pair of equally tensioned springs 56' maintain the arm 56 in a position at right angles with the axis of the sleeve and pipe section. A shaft 57, which is rectangular in cross section, is carried by a bearing at the other end of the arm 56, extending perpendicular to the arm 56 and is longitudinally slidable in the bearing while being prevented from rotating in the bearing. The right-hand end of this shaft 57 (as viewed in FIGS. 2 and 3) is formed into a stub axle for the wheel 54. The opposite end of the shaft 57 is formed with a switch-engaging cam. A bracket 58 (FIG. 2), rigidly mounted on the arm 56, and also extending perpendicular thereto, carries a pair of contact switches 59 and 60 which are connected with the electric control system governing the operation of the motors for the traveling supports at each end of the line, thus 14(A) and 14(F) and the travel of either end of the sprinkling line causes the motors of the successive traveling supports or ambulatory mechanisms to be operated, resulting in forward travel of successive sections of the line.

The arrangement of the arm 56, shaft 57, wheel 54, and contact switches 59 and 60 (FIG. 2) is such that when the sprinkling line 10 extends along in the position shown in FIGS. 1 and 2, and thus at a particular acute angularity with respect to the guide rail 52, as indicated by the arc Y in FIG. 1, the switch 59 will be closed; and similarly, as will now be apparent from these figures, when the sprinkling line 10 swings forwardly until it is in the opposite corresponding acute angularity with respect to the guide rail 52, as indicated by the arc Z in FIG. 1, the switch 60 will be closed. The switches 59 and 60 are connected to a circuit control means located in the housing 61 (FIGS. 2 and 3) mounted on the pipeline, which circuit control means is connnected to a suitable outside electrical source and in turn connected with the motors of the traveling supports or ambulatory mechanisms 14, as presently explained with reference to the diagram in FIG. 9.

The manner in which the lateral travel of the sprinkling line takes place can now be briefly described, first with reference to FIG. 1. Assuming that the sprinkling line 10 is in the full line position of FIG. 1, and thus extending at an angularity Y with respect to the guide rail 52, the closing of switch 59 (FIG. 2) causes the motor for the most distant traveling support 14(F) to be actuated. The operation of the traveling support 14(F) first results in the corresponding pipe section being swung into the position indicated by the first broken line 70. However, when the angularity of this moving pipe section with the adjacent pipe section is sufficient to cause the next traveling support 14(E) to be operated, the next pipe section starts moving into the position indicated by the first broken line 71. As the first traveling support continues its operation, similarly each traveling support inturn is intermittently caused to be operated and the various pipe sections are moved into and from the positions indicated by the broken lines 70, 71, 72, 73 and 74 respectively until all the pipe sections are brought into alignment. However, when this takes place the angularity of the entire moving pipeline with the guide rail 52 (indicated by the arc Z in FIG. 1), will have caused the second switch 60 (FIG. 2) to be closed. The closing of this switch causes the motor for the first traveling support 14(A) to be actuated. The operation of the traveling support 14(A) and the continued forward travel of the adjacent pipe section now results similarly in the intermittent actuation of the motors for successive traveling supports taken in the reverse order, with the result that the sections of the sprinkling line move into the positions successively indicated by the broken lines 75, 76, 77, 78 and 79 until the pipe sections are again in alignment and the angularity of the pipeline with the guide rail will again be the same as indicated by the arc Y in FIG. 1, which causes switch 59 to be closed and the cycle to be repeated.

In other words, the travel of the sprinkling line is brought about by having each end in turn moved forwardly a predetermined distance while the opposite end remains substantially stationary, with the intervening sections of the pipeline successively and intermittently moving into alignment with the moving end of the line. The fact that the greatest amount of travel occurs first for a predetermined distance at one end of the line and then for the same distance at the opposite end of the line, and the fact that the alternate change in the direction of forward travel is controlled by the relationship between one end of the sprinkling line and the guide means extending parallel to the main supply pipeline, prevents the travel of the sprinkling pipeline from inadvertently proceeding too far to one side or the other of the predetermined desired area to be covered.

Referring now the schematic wiring diagram in FIG. 9, the motors operating the traveling supports or ambulatory mechanisms 14(A), 14(B), 14(C), 14(D) and 14(F), are indicted at M(A), M(B), M(C), M(D), M(E) and M(F) respectively. The system is connected to a suitable power supply source through the lines 80 and 81, which include a master control switch 82 and a reversing switch R to enable the motors to be reversed and the change of direction of travel of the sprinkling line to be changed accordingly if desired. Holding relays for temporarily holding the circuits closed to the motors M(A) or M(F) are indicated at 83 and 84 respectively, which holding relays are activated by the closing of the switches 60 or 59 respectively. The switches 60 or 59 are operated by movement of a sliding arm 57 (as previously described with reference to FIG. 2).

Thus with the switch 59 closed (and the sprinkling line in the relative position with the guide rail as shown in FIGS. 1 and 2), the circuit to the motor M(F) for the traveling support 14(F) will be closed, and the traveling support 14(F) will operate, resulting in successive intermittent operation of the motors M(E), M(D), M(C) and M(B), with motor M(A) not operating, until the sprinkling line is brought into alignment and into a second angularity with respect to the guide rail. Then the closing of switch 60 causes the sequence of operations of the traveling supports to be changed as previously described.

Thus far, it has been assumed that one end of the sprinkling line will remain stationary while the other end moves forward; for example, that the traveling support or ambulatory mechanism 14(A) will not move during the time the traveling support 14(F) moves forwardly a predetermined distance with the intermediate traveling supports intermittently moving into alignment between 14(F) and 14(A). However, if preferred, the system can be so arranged that one end of the sprinkling line will move forward slowly while the opposite end moves at a greater speed. This is easily accomplished by having the motors for the two end traveling supports (thus the motors for 14(F) and 14(A)) comprise two-speed motors instead of single-speed motors, thus capable of operating at a desired fast speed and also at a relatively very slow speed. Such arrangement is indicated in the modified diagram of FIG. 10. In this figure M (F') and M(A'), the motors for the respective end traveling supports, are two-speed motors, operating either at high speed when the switch to the motor is closed (such as the switch 84' in FIG. 10) or operating at very low speed when the motor switch, for example the switch 83' remains open as shown in FIG. 10. Otherwise the forward travel of the sprinkling line takes place in the same manner, the motors for the intervening traveling supports operating automatically intermittently in the manner previously described to bring these traveling supports into alignment with the end traveling supports. The general pattern of the forward travel of the sprinkling line is substantially the same as when the traveling support first at one end and then at the other end of the sprinkling line remains entirely stationary.

Various modifications could be made in the apparatus herein described without departing from the general system or principle of the invention. Thus, as previously mentioned, other types of traveling supports could be used for the sprinkling line in place of the ambulatory mechanisms described. Also, it would be possible to have the traveling supports operated by water motors in place of electric motors. The guide track, too, could be constituted in various ways to serve the same purpose. Furthermore, by having additional controls for the motors of the two end traveling supports the course taken by the traveling sprinkling line could be varied at will.

However, the particular apparatus as herein described has proven to be very satisfactory and is considered to be the preferred means for the carrying out of the invention.

I claim:

1. The method of controlling the travel of a mobile sprinkling pipeline mounted for lateral movement on traveling supports, which consists in having each end of the pipeline alternately move forwardly a predetermined distance in a substantially arcuate path with the opposite end of the pipeline constituting approximately the center of curvature of the arcuate path while maintaining the entire pipeline substantially in alignment with the ends of the pipeline, whereby the entire pipeline will swing forward in alternate angular direction, minimizing any tendency for the traveling pipeline when passing over unlevel ground also to move endwise to one side or the other from the desired path.

2. In a moving irrigation system, a flexible sprinkling pipeline, traveling supports for said pipeline positioned near each end of said pipeline and at intervals therebetween, operating means for each of said traveling supports, control means for the operating means for each of the end traveling supports so arranged that each of said end traveling supports will be operated to cause one end of said pipeline alternately to move ahead a predetermined distance further than the other end of said pipeline, and means controlling the operation of the intervening traveling supports acting to cause said intervening traveling supports to bring the intervening portions of said pipeline into alignment with the end portions of said pipeline, whereby said pipeline when moving over the ground will swing forwardly in alternate angular direction.

3. The combination set forth in claim 2 with the sections of said flexible pipeline extending between said traveling supports capable of being moved into angularity with each other, with said operating means for each of said traveling supports including a motor, and with the operation of said motors in said intervening traveling supports occasioned by the movement of the section of said pipeline at one side of the traveling support into angularity with the section of said pipeline at the other side of said traveling support.

4. The combination set forth in claim 2 with said operating means for each of said traveling supports including a motor, with the control means for said end traveling supports including a switch in the circuit to the motor in each of said end traveling supports, and means for automatically and alternately operating said switches.

5. The combination set forth in claim 4 with the addition of a guide element near one end of said pipeline extending along in the direction of travel desired for said pipeline, said means for operating said switches including means sensitive to the angularity between said pipeline and said guide and so arranged that when said pipeline moves in one direction into a predetermined angularity with said guide, one of said switches will be operated and when said pipeline moves to the same angularity with said guide in the alternate direction the other of said switches will be operated, whereby the operation of said switches, resulting in alternate operation of the motors in the traveling supports at the ends of said moving pipeline, will automatically cause said pipeline to swing in alternate angular direction.